United States Patent [19]
Colasanti

[11] Patent Number: 5,294,182
[45] Date of Patent: Mar. 15, 1994

[54] CAR SEAT FOR ADULT OR CHILD PASSENGER

[75] Inventor: Arduino Colasanti, Eastpointe, Mich.

[73] Assignee: Findlay Industries, Inc., Troy, Mich.

[21] Appl. No.: 957,993

[22] Filed: Oct. 8, 1992

[51] Int. Cl.⁵ .......................... A47C 15/00; B60N 2/30; B60N 2/26; B60R 21/00

[52] U.S. Cl. .................................. 297/467; 297/115; 297/238; 297/391; 297/484

[58] Field of Search ............... 297/467, 238, 113, 115, 297/391, 397, 484

[56] References Cited

U.S. PATENT DOCUMENTS

| | | | |
|---|---|---|---|
| 4,230,366 | 10/1980 | Ruda | 297/487 |
| 4,341,422 | 7/1982 | Cunningham | 297/488 |
| 4,655,503 | 4/1987 | Kamijo et al. | 297/238 |
| 4,664,443 | 5/1987 | Casale | 297/238 |
| 4,943,112 | 7/1990 | Law | 297/238 |
| 5,106,158 | 4/1992 | Dukatz et al. | 297/238 |

Primary Examiner—Alexander Grosz
Attorney, Agent, or Firm—Weintraub, Duross & Brady

[57] ABSTRACT

An automobile car seat which connects to a child safety seat includes armrests which are pivoted and extended from recessed positions within the back of the seat and a headrest. When extended, the armrests prevent lateral movement of a child on the seat. When pivoted into a substantially upright position, the headrest may then be detached from the back of the seat and be releasably mounted to the seating portion. Straps attached to the headrest and the back of the seat are pulled forward from the interior of the back, such that the straps restrain forward movement of the child. The seat may be a bucket seat and may be deployed as the passenger seat of the vehicle.

7 Claims, 3 Drawing Sheets

FIG 6
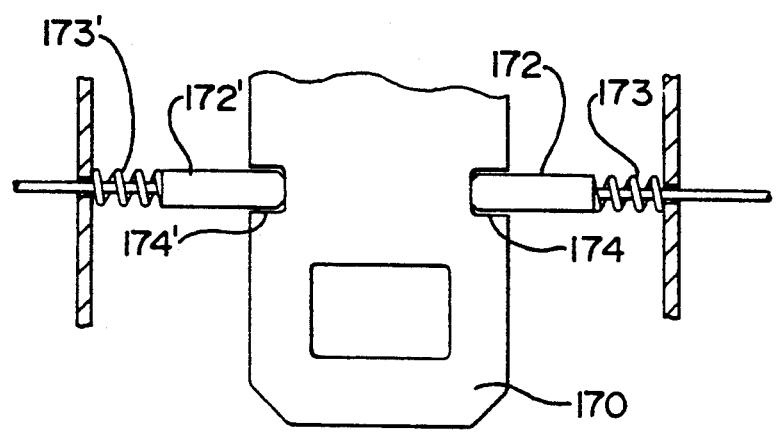
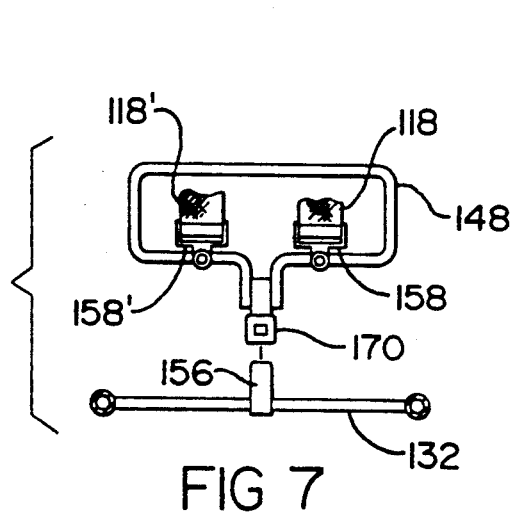
FIG 7
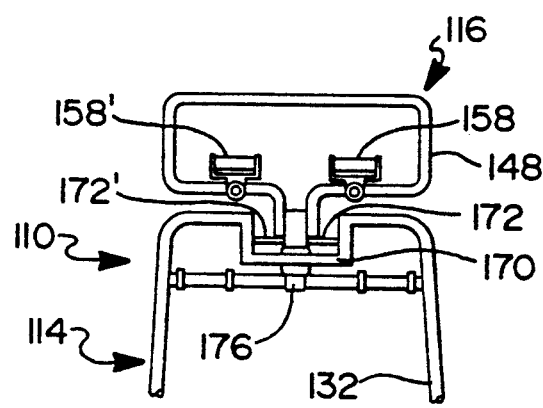
FIG 8

CAR SEAT FOR ADULT OR CHILD PASSENGER

BACKGROUND OF THE INVENTION

1. Field of the Invention

The present invention concerns passenger seats in an automobile. More particularly, the present invention concerns an adult passenger seat which can be easily adjusted to safely accommodate a child thereon.

2. Description of the Prior Art

Child car seats are well known. The efficacy and necessity of these devices is such that many states require their mandatory usage for children under a certain age, usually three years.

One type of child car seat is the removable car seat. These devices are raised seat secured to a passenger seat in the rear portion of the passenger compartment of a car. The child is placed upon the seat and secured thereon by restraining straps, bars or other similar means. The seat is normally secured using the safety belts, thus anchoring the childseat.

Although effective, these seats suffer some notable drawbacks. Firstly, the seat may not be properly secured by the parent or other adult. This can result in the failure of the car seat to protect the child. Secondly, the seat, when not needed, must be removed and stored elsewhere. Apart from being an inconvenience, this situation leads to the temptation not to use the child seat. Also, the seat can be lost or otherwise unlocatable, and thus inaccessible, when needed. Thus, the child would be either prevented from traveling in the car or placed in a situation risking his or her safety.

A second type of car seat concerns those built into or otherwise formed as a part of the existing automobile seat. This type of seat is built such that a child can be seated safely in the automobile by folding downwardly or otherwise moving, a cross member associated with the seat over the child. Quite often this cross member serves a dual purpose, such as a head rest or the like.

One example of such built-in seat restraints is disclosed in U.S. Pat. No. 4,230,366 issued Oct. 28, 1980 to Ruda. Ruda teaches a passive child restraint which is built into the rear bench seat of an automobile. The U-shaped member is variously disposed around the child so that the child has both his/her lateral and forward movement restricted. The U-shaped restraint member may be rotated, lifted or pulled out into position around the child.

Another seat of this type is disclosed in U.S. Pat. No. 4,341,422 issued Jul. 27, 1982 to Cunningham, and is entitled "RESTRAINT DEVICE". Cunningham teaches a child restraint device that alternatively serves as a headrest for an adult. The restraint device comprises a lastingly deformable rigid foam member having a convexo-concavo surface. The foam member is secured to the top portion of a seat back. When an infant is seated on the carseat, the foam member may be removed from the top of the seat and placed on the lap of the child. The foam member is then secured thereto by the car seat belt. The foam member is lowered into position via webs wound around and extendable from retractor wheels. When mounted atop the carseat, the foam member encompasses and hides the webs and retractor wheels.

Another known seat is described in U.S. Pat. No. 4,644,443 issued May 12, 1987 to Casale for an "AUTOMOBILE CONVERTIBLE SEAT". The seat of Casale is built on the opposite side of an adult carseat deployed in the rearward part of the passenger compartment. The adult seat is rotated downwardly, by which action the infant is secured on the seat. Additionally, straps may be utilized to firmly secure the infant within the seat.

Still another seat is described in U.S. Pat. No. 4,943,112 issued Jul. 24, 1990 to Law for a "CHILD'S COLLAPSIBLE CARSEAT". Law teaches a child's carseat which is built into an adult carseat. The seatback is pulled down and rested horizontally upon the lower portion of the seat. The seatback then forms the lower portion of the child seat. The headrest is then rotated forwardly and downwardly, securing the child therein. The back of the child carseat is defined by the newly exposed area which previously the lower portion had been secured.

It is to be appreciated from the preceding that none of the prior art built in seats is adaptable for a "bucket" seat. Likewise, each of the prior art "built-in" seat is difficult to re-assemble into its normal adult seat. Thus, there exists a need in the art for a carseat for that accommodates a child that is easily reassembled when the seat is needed by an adult. Further, these is a need for an adult/child built-in bucket carseat. It is to these needs that the present invention is directed.

SUMMARY OF THE INVENTION

The present invention is an automobile car seat capable of securing a child safely thereon, the seat comprising:

(a) a lower seating portion;

(b) an upper back rest portion pivotally attached to the lower portion;

(c) a pair of spaced apart armrests pivotally attached to the upper section, the armrests restricting lateral movement of the child;

(d) a head rest releasably attachable to one portion of the chair; and (e) means for restraining forward movement of a child disposed upon the lower portion.

In a preferred embodiment, the means for restraining comprises a plurality of rollers attached to the upper portion of the seat, and a plurality of restraining straps, the straps heaving a first end and a second end. The first end of each strap is connected to one of the rollers. The second end of each strap is connected to the headrest. When the headrest is attached to the lower portion, the straps are deployed across the child to prevent forward movement. In a second embodiment, the rollers may be deployed in the headrest.

The car seat of the preset invention further comprises means for controlling the pivoting of the upper portion, such that the seat may be reclined for an adult or secured substantially upright for a child.

The seat of the present invention may further comprise a control mechanism for preventing detachment of the headrest from the upper portion unless the back is at a required inclination and/or the armrests are extended outwardly in a normal position.

The present invention will now be more clearly described with reference to the accompanying drawings, in which like reference numerals refer to like elements, and wherein:

BRIEF DESCRIPTION OF THE DRAWINGS

FIG. 6 is a second embodiment of the present invention, showing spring-biased prongs that secure the headrest in the upper portion of the seat;

FIG. 7 is a skeletal view of the second embodiment of the present invention, wherein the headrest is detached from the frame of the upper portion of the seat; and FIG. 8 is a skeletal view of the second embodiment of the present invention, wherein the headrest is mounted atop the upper portion of the seat.

DETAILED DESCRIPTION OF THE PREFERRED EMBODIMENTS

Figure 1:
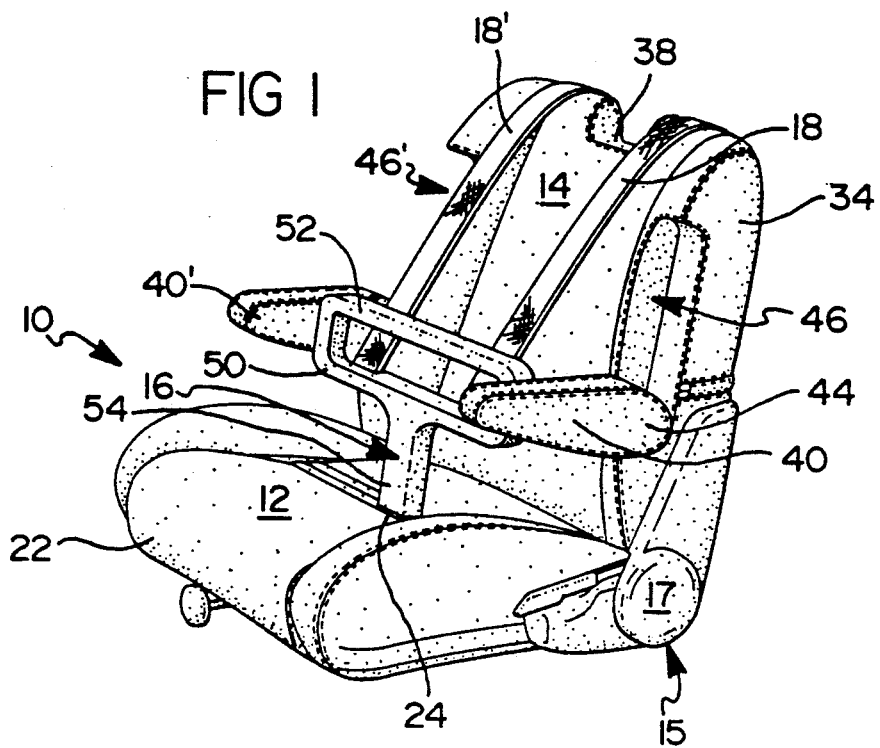
FIG. 1 is a perspective view of the car seat of the present invention.

Referring now to FIG. 1, there is shown therein a car seat 10 in accordance with the present invention. The seat 10, hereof, generally, comprises a lower seating portion 12, an upper portion or backrest portion 14 and a headrest 16 removably attached to either the upper portion 14 at the upper end thereof, or the lower portion 12, as shown, and a pair of straps 18, 18'.

Figure 4:
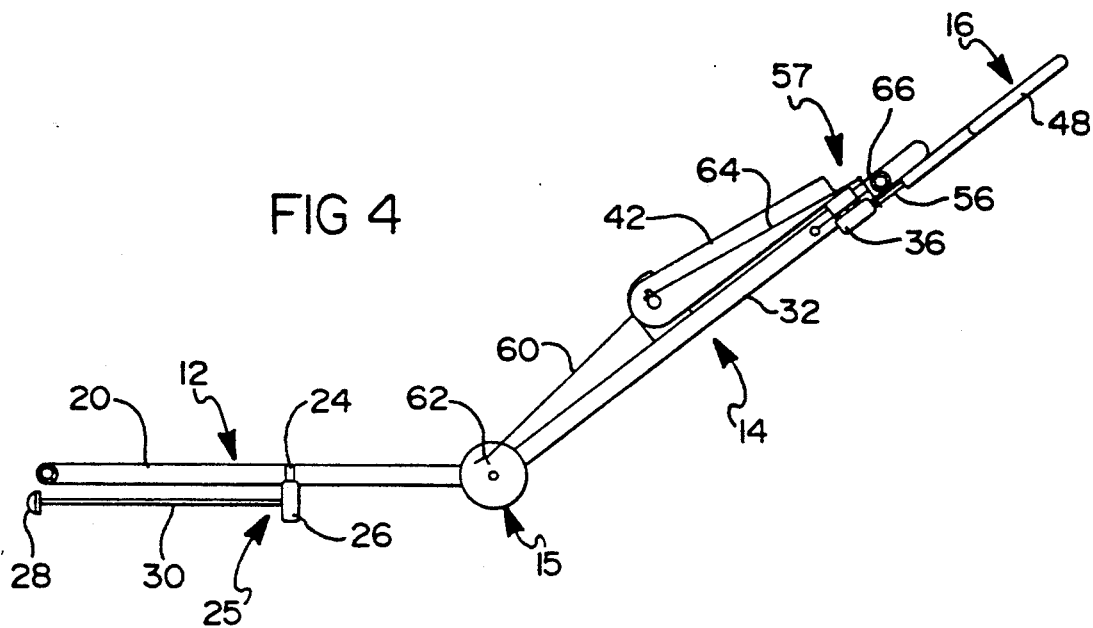
FIG. 4 is a skeletal view of the seat of the present invention in a reclined position.
Figure 5:
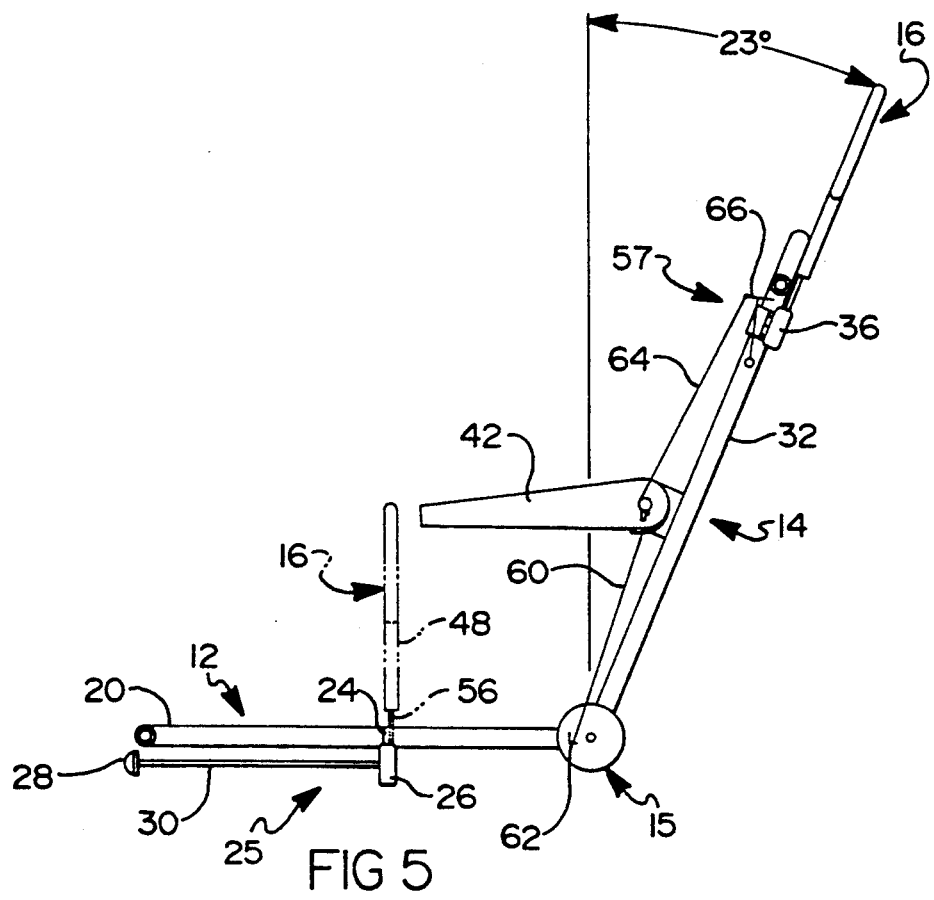
FIG. 5 is a skeletal view of the seat of the present invention rotated into a proper position to secure a child thereon.

As seen in FIGS. 1, 4 and 5, the lower portion 12 of the seat 10 comprises a frame member 20, a supportive material (not shown), such as polyurethane foam, which is deployed around the frame member 20, and a covering 22 encompassing the supportive material and the frame 20. The frame member 20 is formed of a suitable sturdy material, such as steel, or the like which is capable of upholding the weight of either an adult or a child seated thereon. The covering 22 is made of any suitable material, such as cloth, vinyl, leather or the like, as is known in the art.

The lower portion 12 further has a slot 24 formed therein in a central location. Means for securing the headrest 16 to the lower portion 12 is associated therewith and generally indicated at 25. The means for securing 25 comprises a first receiving member 26 disposed below the lower portion 12. The receiving member 26 is in registry with the slot 24 such that communication is made to the receiving member 26 through the slot 24. A handle 28 is connected to a shaft 30. The shaft 30 contacts the receiving member 26 to press a spring-biased release incorporated within the receiving member 26, as is well known in the art. The member 26, handle 28 and shaft 30 cooperate to define a release for the headrest as defined hereinafter. The headrest 16 may then be mounted upon the lower portion 12 releasably through the slot 24 and into the receiving member 26, as will be described in detail herein further below.

The upper portion 14 comprises a frame structure 32, a supportive material (not shown) disposed around the frame structure 32, and a covering 34 encompassing the frame structure 32 and supportive material, in a manner similar to the lower portion 12 and known in the art. The upper portion 14 further comprises a second receiving member 36 mounted near the top of the upper portion 14 and which projects thereinto. An opening 38 is formed at the top of the upper portion 14 and registers with the receiving member 36 to allow the headrest 16 to be mounted thereinto, as will be described herein further below.

The upper portion 14 is pivotally mounted to the lower portion 12 via means for pivoting 15. The means for pivoting 15 comprises a rod to which the upper portion 14 and lower portion 12 are joined and a mechanism, such as a dial 17, for setting the particular inclination. The means for pivoting 15 allows the reclining of the back portion between an upright position and a nearly flat position, in the well-known manner, such s is disclosed in U.S. Pat. No. 4,781,415 to Heesch et alia, and is incorporated here by reference.

A first armrest 40 and a second armrest 40' are pivotally mounted upon the upper portion 14, as shown. The armrests 40, 40' are symmetrical opposites and substantially identical, and thus only the first armrest 40 will be described in detail with all discussion to be equally applicable to the second armrest 40'. The armrest 40 comprises a frame portion 42, a supportive material (not shown) and a covering 44. The armrest 40 is connected to the upper portion 14 along an associated side thereof. The armrest 40 may be pivotally deployed to an extended position, as shown in FIG. 1, or in an upright position. When deployed in an upright position, the armrest 40 fits into a recess 46 formed in the upright member 14. When placed in the upright position, the armrest 40 becomes a continuous part of the outer surface of the upper portion 14 defined by the covering 44. This fitting of the armrests 40 into the recesses 46 allows the seat to comfortably accommodate an adult, with the armrest 40 upright, or a child, when the armrest 40 are extended.

Figure 2:
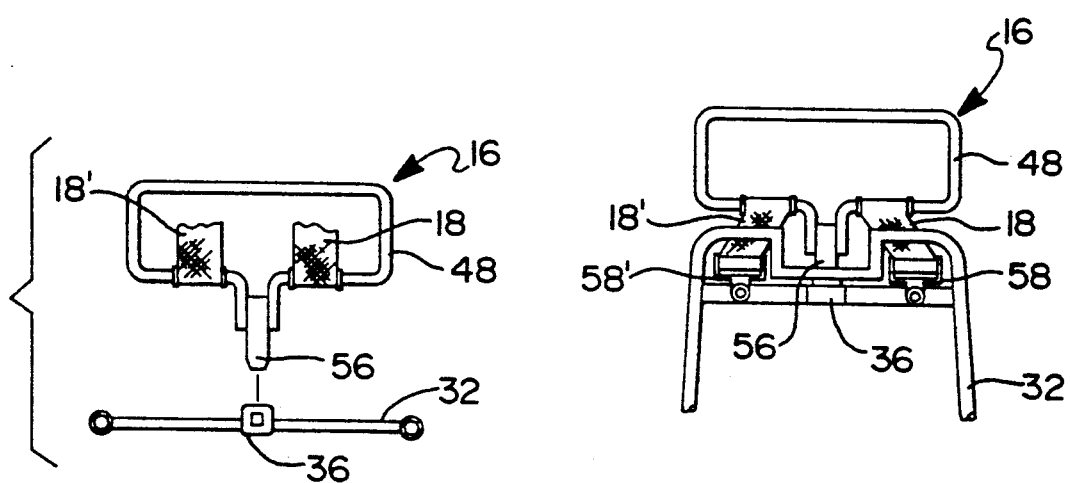
FIG. 2 is a skeletal view of the upper portion and headrest of the car seat of the present invention.
Figure 3:
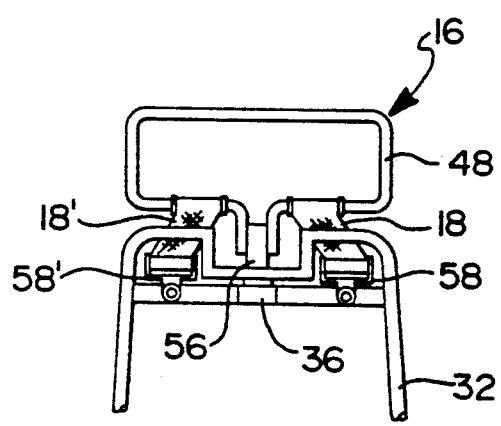
FIG. 3 is a skeletal view of the headrest detached from the frame of the upper portion of the seat.

The headrest 16, as shown in FIGS. 1-3, has a frame member 48, a layer of foam (not shown) surrounding the frame 48 and an outer covering 50. The frame member 48 is formed of steel or other suitable sturdy material. The outer covering 50 comprises a resilient yet strong material, such as rubber, to hold in the foam material and give a soft, attractive exterior. The headrest 16 ha a loop portion 52 and a stem 54. The headrest 16 may be formed in other configurations, in particular an embodiment which substitutes an enclosed, supported member for the loop portion 52. This enclosed member would have a frame portion, foam supportive material disposed therearound, and a covering. Such a configuration could also incorporate retractable rollers for restraining straps, as will be set forth in further detail herein below.

The stem 54 of the headrest 16 has a tongue 56 formed at the lower end thereof. The tongue 56 interfaces and releasably interlocks with either the first and second receiving members 24, 36 through the slot 24 and opening 38 respectively, as described hereinbelow.

The seat 10 of the present invention further comprises means for controlling the release of the headrest 16. As shown in FIGS. 4 and 5, the means for controlling comprises a control mechanism generally indicated at 57, in mechanical communication between the means for reclining 15, the armrests 40, 40' and the second receiving member 36.

The headrest 16 is normally deployed atop the upper portion 14, mounted in the second receiving member 36. For proper passenger safety, it is imperative that the headrest 16 only come detached when desired, that is when it is being moved to the lower portion 12 to secure a child therein. To ensure this, the means 57 for controlling the release of the headrest 16 will allow the release of the headrest 16 when two conditions are satisfied. First, the upper portion 14 must be in a proper seating position relative to the lower portion 12. Second, the armrests 40, 40' must be extended.

For proper safety of a child passenger on the seat 10, the upper portion 14 must be within 23 degrees of perpendicular to the lower portion 12 to provide necessary support. The inclination of 23 degrees has been set forth as a test-proven standard. However, other different positioning, such as perpendicular or a setting between perpendicular and 23°, can be established as the proper position. As shown in FIGS. 4 and 5, a rod 60 is in communication with the armrest 40 and the means 15 for inclining. An equivalent rod (not shown) places the armrest 40' in communication with the means for inclining and operates in a substantially identical manner.

The rod 60 is formed of a suitable material, such as steel, and may be rigid or, preferably, flexible. The rod 60 could be a wire, if desired. The rod 60 is extended into a coupling mechanism, shown generally at 62, in the means 15 for inclining when the armrest 40 is extended. This extension of the rod 60 can only occur when the seat back 14 is in the proper position, as shown in FIG. 5. When the inclination is different from the proper inclination, as is shown in FIG. 4, the rod 60 cannot be extended. Thus, extension of the armrest 40 from the recess 46 cannot occur.

A second rod 64 is connected between the armrest 40 and the second receiving member 36. Specifically, the second rod 64 is attached to a pin 66 which is part of the second receiving member 36. When the armrest 40 is in an upright position and within the recess 46, the pin 66 acts to hold the headrest 16 within the receiving member 36. When the armrest 40 is extended, the second rod 64 is correspondingly extended. This action withdraws the pin 66 from the second receiving member 36. It is noted that the armrest 40' has an equivalent rod (not shown) to the second rod 64 in communication with the pin 66. Thus, extension of the armrest 40' is also required for release of the headrest 16. When the armrests 40,40' are extended, the headrest 16 is released and its removal form the upper portion 14 is allowed.

Thus, when a child is placed upon the seat 10 and securement of the child is desired, the seat 10 is placed in the proper position and the armrests 40, 40' are extended. The headrest 16 may then be removed from the second receiving member 36. The headrest 16 may then be lowered to the lower portion 12, such that the tongue 56 is placed within the first receiving member 24. The stem 54 of the headrest 16 is disposed between the legs of the child, the lower part of the loop portion 52 being proximate over the legs of the child.

When lowered and mounted to the lower portion 12, the headrest 16 extends straps 18, 18' from the upper portion 14. The straps 18, 18' unwind from recoiling rollers 58, 58' disposed on the frame portion 32 of the upper member 14. The straps 18, 18' are connected to the headrest 16 so that the lowering of the headrest 16 pulls the straps 18, 18' from the recoiling rollers 58, 58'. This deploys the straps 18, 18' across the upper torso of the child (not shown). The straps 18, 18' and the headrest 16 prevent forward movement of the child in the event of an accident. The armrests 40, 40' prevent lateral movement of the child. Thus, thus, provides total securement of the child in an easy-to-use seat.

When the headrest 16 i to be removed, the handle 28 is grasped and pushed inwardly by the parent or other adult. This forces the shaft 30 into the first receiving member 26 and disengaging the headrest 16, as is known in the art. The headrest 16 may then be raised from the lower portion 14. The recoiling rollers 58, 58', as seen in FIGS. 2 and 3, then rewind the straps 18, 18' therearound, as is known in the seat belt art. The headrest 16 is then mounted upon the upper portion 14 as shown in FIG. 2, with the tongue 56 being deployed in the second receiving member 36 and the straps 18, 18' wound around the rollers 58, 58'. The armrests 40, 40' may then be raised into the recesses 46, 46' to secure the headrest 16 upon the upper portion 14.

The seat 10 of the present invention may be formed into a bucket seat or into a bench seat. The deployment of the present invention in the bucket seat allows for the deployment of the child seat in the passenger seat of an automobile. This affords the child maximum safety while offering the parent or other guardian driving the vehicle to have the child within arm reach in the front portion of the passenger compartment of the vehicle. The removable child seats known in the Applicant must be mounted in the back seat of the passenger compartment. Similarly, the known and disclosed built-in child seats require the additional hidden space beyond the bench seat of the back portion of the passenger compartment to be deployed. This obviates the possibility of deploying these seats in the front portion of the passenger compartment.

Referring now to FIG. 6, there is shown a second embodiment for the present invention. Specifically, there is shown a second means for securing the headrest in the upper portion with a different deployment of the recoiling rollers.

Referring to FIG. 6, there is shown a receiving member or buckle 170 attached to the headrest (not shown except for the buckle 170). The buckle 170 is similar to that set forth in the first embodiment. The pin of the first embodiment, however, is replaced by a pair of spring-biased prongs 172, 172' having corresponding springs 173, 173'. The prongs 172, 172' fit into notches 174, 174' formed in the buckle 170, thus securing the headrest. When the armrests are extended, as described herein, above in the first embodiment, each armrest can retract one of the pair of prongs 172, 172'. When both armrests are extended, the prongs 172, 172' are retracted and the headrest is released.

Referring now to FIGS. 7 and 8, there is shown the second embodiment of the headrest, wherein the receiving member or buckle 170 is mounted on the headrest, and a tongue 76 is attached to the upper portion 114 of the seat. The attachment of the buckle 170 and tongue 176 is substantially similar to that set forth above. Additionally, when the extension of the armrests is achieved, means for releasing the headrest, contained in the headrest, such as a button connected to the buckle 170, is depressed. Thus, a third measure is added to the securement of the headrest on the upper portion 114 of the seat.

The headrest 116 also has the recoiling rollers 158, 158' mounted therein. The straps 118, 118' are drawn out from the headrest 116 as it is lowered into position on the lower portion. The straps 118, 118' are retracted when the headrest 116 is again raised, similar to the operation set forth herein above and common in the art.

Having, thus, described the present invention, what is claimed is:

1. An automobile car seat capable of securing an adult or a child safely thereon, the seat comprising:
    (a) a lower portion;
    (b) an upper portion pivotally attached to the lower portion;

(c) a pair of spaced apart armrests pivotally attached to the upper section, the armrests being pivotal between an extended position and an upright position, the armrests restraining lateral movement of the child when extended;
(d) a headrest releasably attachable to the upper portion said headrest, in a child supporting configuration, being adapted to be releasably lockable to the lower portion of the chain in front of a sitting child, and
(e) means for restraining forward movement of the child connected between the headrest and the upper portion, whereby when the headrest is attached to the upper portion, the car seat is adapted to support and adult, and when the armrests are in the extended position and the headrest is attached to the lower portion, the car seat is adapted to securely support a child.

2. The seat of claim 1, the means for restraining comprising:
(a) at least one roller attached to the upper portion;
(b) at least one strap having a first end and a second end, the first end of each strap being connected to one roller, the second ends of the straps being affixed to the headrest; and
wherein the strap extends across the body of the child to restrict forward movement when the headrest is mounted upon the lower portion, and wherein the strap is wound around the roller when the headrest is mounted upon the upper section.

3. The seat of claim 1 further comprising means for controlling the pivoting of the upper portion.

4. The seat of claim 1 further comprising a control mechanism, the control mechanism being in mechanical communication with the armrests, the control mechanism preventing the release of the headrest from the upper portion when either armrest is deployed in the upright position.

5. The seat of claim 4, further comprising:
means for controlling the pivoting of the upper portion, the control mechanism being in communication with the means for controlling the pivoting.

6. The seat of claim 1, wherein the seat is a bucket seat.

7. An automobile car seat adapted to support a child or an adult, comprising:
(a) a lower portion;
(b) an upper portion pivotally mounted to the lower portion, the upper portion having a plurality of recesses formed therein
(c) means for controlling the pivoting of the upper portion;
(d) a pair of spaced apart armrests pivotally connected to the upper portion, the armrests being pivotal between an extended position and an upright position, the armrests fitting into corresponding recesses formed in the upper portion;
(e) a headrest, the headrest being releasably mounted upon the upper portion of the seat or the lower portion of the seat.
(f) a pair of retractable rollers mounted within the headrest;
(g) a pair of straps, each strap having a first end attached to one roller and a second end attached to the upper portion, the straps being wound around the rollers when the headrest is mounted upon the upper portion and extended between the headrest and the upper portion when the headrest is mounted upon the lower portion; and
(h) means for releasing the headrest from the upper portion.

* * * * *

UNITED STATES PATENT AND TRADEMARK OFFICE
CERTIFICATE OF CORRECTION

PATENT NO. : 5,294,182
DATED : March 15, 1994
INVENTOR(S) : Arduino Colasanti It is certified that error appears in the above-identified patent and that said Letters Patent is hereby corrected as shown below:

Column 2, line 45: replace "heaving" with --having--.
Column 4, line 8: replace "s" with --as--.
Column 4, line 39: replace "ha" with --has--.
Column 4, line 51: replace the first occurrence of "24" with --26--.
Column 5, line 64: replace "i" with --is--.
Column 6, line 46: after "headrest" insert --116--.
Column 6, line 47: replace "76" with --176--.
Column 6, line 51: after "headrest" insert --116--.
Column 6, line 52: after "headrest" insert --116--.
Column 7, line 9: replace "chain" with --chair--.

Column 8, line 24: replace "." with --;--.

Signed and Sealed this

Sixth Day of December, 1994

Attest:

BRUCE LEHMAN

*Attesting Officer*        *Commissioner of Patents and Trademarks*